June 18, 1968         N. C. FROST, JR         3,388,887
DEVICE FOR MOLDING SOLID THERMOPLASTIC BODIES
Filed March 15, 1966
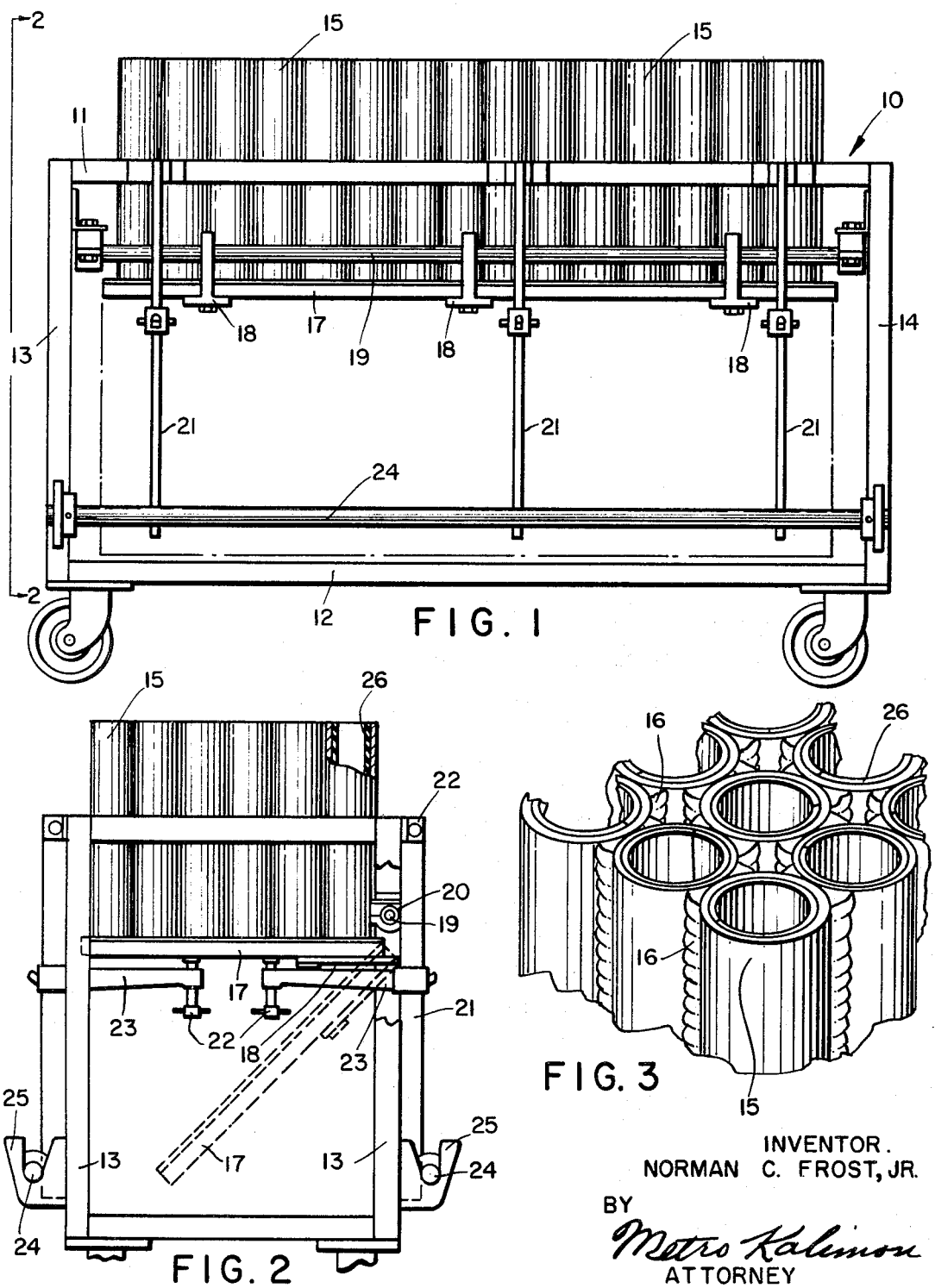
INVENTOR.
NORMAN C. FROST, JR.
BY
*Metro Kalimon*
ATTORNEY

United States Patent Office 3,388,887
Patented June 18, 1968

3,388,887
DEVICE FOR MOLDING SOLID THERMOPLASTIC BODIES
Norman C. Frost, Jr., North Reading, Mass., assignor to W. R. Grace & Co., Cambridge, Mass., a corporation of Connecticut
Filed Mar. 15, 1966, Ser. No. 534,333
4 Claims. (Cl. 249—120)

This invention relates to a device for forming plastic bodies. In a particular aspect, it relates to a device for forming cements in cylindrical shape which are useful as bonding materials for sealing side seams of container bodies.

The present invention is especially applicable for forming cements which are useful in apparatus for depositing the cement to the side seam of containers as described in U.S. Patent No. 2,773,496. In this patent, the cement is fed as a solid cylindrical block to the feeding chamber, and it issues from the heated apparatus in a liquid state while disposed in a horizontal position. Consequently, a uniform and controlled feeding pressure is obtained while operating on a continuous basis with practically no loss of material. In addition, the cylindrical bodies permit closer packing of the cement in the dispensing apparatus.

In essence, the device of this invention comprises a series of hollow mold-forming cylinders mounted vertically on a rigid frame and includes a swingable imperforate panel secured underneath the bottom portion of the cylinders to permit opening and closing thereof.

In the drawing:
FIG. 1 is a side elevation view of the apparatus mounted on wheels for ease of movement thereof.
FIG. 2 is a front elevation view of the device taken along the line 2—2 of FIG. 1 and shows the panel member in outline in open position.
FIG. 3 illustrates a fragmentary section of the cylindrical mold forms.

Numeral 10 illustrates the frame generally and is constructed of a pair of upper and lower rectangular sections 11 and 12, each of which is connected to a pair of opposed front and rear vertical rods 13 and 14. A plurality of hollow mold-forming cylinders 15 aligned in ranks and files are fixed to the frame by suitable means, such as welding. Each cylinder is secured to the adjacent cylinders by means of weld spots 16 as shown in FIG. 3. An imperforate panel 17 is disposed underneath the bottom portions of the cylinder 15 to retain the plastic bodies within the respective cylinders. The panel swings toward and away from the cylinder bottom portions by means of spaced L-shaped hinges 18 which pivot on shaft 19 journaled in bearings 20.

A vertical bar 21 is pivotally affixed at 22 of the upper rectangular section 11 for lateral movement thereof to permit the panel to move into open position. The panel is maintained in closed position by means of threaded clamps 22 which are attached to arms 23 for slidable movement on the vertical bar 21. The lower end of the vertical bar is biased against horizontal bars 24 which are mounted on each side of the frame and are held in place by the slotted retention members 25.

In forming the plastic bodies, suitable molten cement, such as a polyamide resin, is poured into each of the hollow cylinders and is confined within the cylinders by moving the panel 17 into closed position as shown in FIG. 2. The plastic material is then allowed to solidify over a prescribed cooling period. To remove the solidified bodies, the clamps 22 are unscrewed to permit the panel to open as shown in outline in FIG. 2. The horizontal bars 24 are then lifted out of the slotted retention members 25 whereby the vertical bar 21 is moved laterally. Upon release of the panel from its closed position, the solidified cylindrical plastic bodies then readily slip out of the forms. To permit ease of removal of the solidified bodies from the cylinders, it is desirable to coat the inner surface of each cylinder with a release agent 26, such as a silicone fluid or a film of polytetrafluoroethylene. It is also desirable to coat the surface of the panel which is in contact with the bottom of the cylinders with the release agent.

I claim:
1. A device for molding plastic bodies which comprises
   (a) an upstanding frame,
   (b) a plurality of vertically aligned hollow mold-forming cylinders fixed to the frame, each of said cylinders being secured to the adjacent cylinders,
   (c) an imperforate rigid panel hingedly affixed at one of its ends to the frame for openable and closeable movement underneath the bottom portions of the cylinders, and
   (d) means for holding said panel in closed position including a vertical bar fixed on the upstanding frame and a clamp mounted on the vertical bar for slidable movement thereon.
2. A device according to claim 1 wherein the lower portion of the vertical bar is held against lateral movement by a removable horizontal rod mounted on the said frame.
3. A device according to claim 1 wherein the inner surface of each cylinder is clad with a release agent.
4. A device according to claim 3 wherein the release agent is a film of polytetrafluoroethylene.

References Cited

UNITED STATES PATENTS

| | | | |
|---|---|---|---|
| 1,063,144 | 5/1913 | Wallace | 249—119 X |
| 1,070,476 | 8/1913 | Hunholz | 249—119 |
| 1,215,797 | 2/1917 | Gutteridge | 249—119 |
| 3,113,672 | 12/1963 | Brown | 249—119 X |

FOREIGN PATENTS

| | | |
|---|---|---|
| 592,701 | 2/1960 | Canada. |
| 20,336 | 1904 | Great Britain. |

J. HOWARD FLINT, JR., *Primary Examiner.*